US012771659B2

(12) United States Patent
Desserrey et al.

(10) Patent No.: US 12,771,659 B2
(45) **Date of Patent: *Oct. 20, 2026**

(54) USER PRESENCE STATUS INDICATORS GENERATION AND MANAGEMENT IN MULTILEVEL CONVERSATIONS

(71) Applicant: Snap Inc., Santa Monica, CA (US)

(72) Inventors: Laurent Desserrey, Los Angeles, CA (US); Dylan Shane Eirinberg, Venice, CA (US); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 18/949,572

(22) Filed: Nov. 15, 2024

(65) Prior Publication Data

US 2025/0080479 A1 Mar. 6, 2025

Related U.S. Application Data

(63) Continuation of application No. 17/396,983, filed on Aug. 9, 2021, now Pat. No. 12,170,638.

(Continued)

(51) Int. Cl.

*H04L 51/043* (2022.01)
*H04L 51/046* (2022.01)

(Continued)

(52) U.S. Cl.

CPC .......... *H04L 51/043* (2013.01); *H04L 51/046* (2013.01); *H04L 51/18* (2013.01); *H04L 51/216* (2022.05); *H04L 67/535* (2022.05)

(58) Field of Classification Search

CPC ..... H04L 51/043; H04L 51/046; H04L 51/18; H04L 67/535; H04L 51/52; H04L 51/10; H04L 51/216; G06F 3/04817

See application file for complete search history.

(56) References Cited

U.S. PATENT DOCUMENTS 5,880,731 A 3/1999 Liles et al.
6,023,270 A 2/2000 Brush, II et al.

(Continued)

FOREIGN PATENT DOCUMENTS

CN 109863532 6/2019
CN 110168478 8/2019

(Continued)

OTHER PUBLICATIONS

"U.S. Appl. No. 17/396,983, Examiner Interview Summary mailed Feb. 9, 2023", 2 pgs.

(Continued)

*Primary Examiner* — Johnny B Aguiar

(74) *Attorney, Agent, or Firm* — Schwegman Lundberg & Woessner, P.A.

(57) ABSTRACT

A method and a system include providing for a group conversation between plural users including a first user and a second user; determining that the second user is active within one of the main conversation view or the experience page; upon determining that the second user is active in the main conversation view, providing a first graphical element for display on a first device associated with the first user, the first graphical element including an avatar and name of the second user; and upon determining that the second user is active in the experience page, providing a second graphical element for display on the first device associated with the first user, the second graphical element including the avatar and name of the second user together with an icon representing the experience page.

14 Claims, 13 Drawing Sheets

Related U.S. Application Data

(60) Provisional application No. 63/168,506, filed on Mar. 31, 2021.

(51) Int. Cl.
*H04L 51/18* (2022.01)
*H04L 51/216* (2022.01)
*H04L 67/50* (2022.01)

(56) References Cited

U.S. PATENT DOCUMENTS

| | | | |
|---|---|---|---|
| 6,223,165 | B1 | 4/2001 | Lauffer |
| 6,772,195 | B1 | 8/2004 | Hatlelid et al. |
| 6,842,779 | B1 | 1/2005 | Nishizawa |
| 7,342,587 | B2 | 3/2008 | Danzig et al. |
| 7,468,729 | B1 | 12/2008 | Levinson |
| 7,636,755 | B2 | 12/2009 | Blattner et al. |
| 7,639,251 | B2 | 12/2009 | Gu et al. |
| 7,775,885 | B2 | 8/2010 | Van et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,146,005 | B2 | 3/2012 | Jones et al. |
| 8,151,191 | B2 | 4/2012 | Nicol |
| 8,384,719 | B2 | 2/2013 | Reville et al. |
| RE44,054 | E | 3/2013 | Kim |
| 8,396,708 | B2 | 3/2013 | Park et al. |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,597,121 | B2 | 12/2013 | del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,890,926 | B2 | 11/2014 | Tandon et al. |
| 8,892,999 | B2 | 11/2014 | Nims et al. |
| 8,924,250 | B2 | 12/2014 | Bates et al. |
| 8,963,926 | B2 | 2/2015 | Brown et al. |
| 8,989,786 | B2 | 3/2015 | Feghali |
| 9,086,776 | B2 | 7/2015 | Ye et al. |
| 9,105,014 | B2 | 8/2015 | Collet et al. |
| 9,241,184 | B2 | 1/2016 | Weerasinghe |
| 9,256,860 | B2 | 2/2016 | Herger et al. |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,460,541 | B2 | 10/2016 | Li et al. |
| 9,489,760 | B2 | 11/2016 | Li et al. |
| 9,503,845 | B2 | 11/2016 | Vincent |
| 9,508,197 | B2 | 11/2016 | Quinn et al. |
| 9,544,257 | B2 | 1/2017 | Ogundokun et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,648,376 | B2 | 5/2017 | Chang et al. |
| 9,697,635 | B2 | 7/2017 | Quinn et al. |
| 9,706,040 | B2 | 7/2017 | Kadirvel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |
| 10,158,589 | B2 | 12/2018 | Collet et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,348,662 | B2 | 7/2019 | Baldwin et al. |
| 10,362,219 | B2 | 7/2019 | Wilson et al. |
| 10,432,559 | B2 | 10/2019 | Baldwin et al. |
| 10,454,857 | B1 | 10/2019 | Blackstock et al. |
| 10,475,225 | B2 | 11/2019 | Park et al. |
| 10,504,266 | B2 | 12/2019 | Blattner et al. |
| 10,516,851 | B1 * | 12/2019 | Eirinberg ................ H04L 51/04 |
| 10,573,048 | B2 | 2/2020 | Ni et al. |
| 10,656,797 | B1 | 5/2020 | Alvi et al. |
| 10,657,695 | B2 | 5/2020 | Chand et al. |
| 10,657,701 | B2 | 5/2020 | Osman et al. |
| 10,762,174 | B2 | 9/2020 | Denton et al. |
| 10,872,451 | B2 | 12/2020 | Sheth et al. |
| 10,880,246 | B2 | 12/2020 | Baldwin et al. |
| 10,895,964 | B1 | 1/2021 | Grantham et al. |
| 10,896,534 | B1 | 1/2021 | Smith et al. |
| 10,913,004 | B1 | 2/2021 | Wu et al. |
| 10,933,311 | B2 | 3/2021 | Brody et al. |
| 10,938,758 | B2 | 3/2021 | Allen et al. |
| 10,964,082 | B2 | 3/2021 | Amitay et al. |
| 10,979,752 | B1 | 4/2021 | Brody et al. |
| 10,984,575 | B2 | 4/2021 | Assouline et al. |
| 10,992,619 | B2 | 4/2021 | Antmen et al. |
| 11,010,022 | B2 | 5/2021 | Alvi et al. |
| 11,030,789 | B2 | 6/2021 | Chand et al. |
| 11,036,781 | B1 | 6/2021 | Baril et al. |
| 11,063,891 | B2 | 7/2021 | Voss |
| 11,069,103 | B1 | 7/2021 | Blackstock et al. |
| 11,080,917 | B2 | 8/2021 | Monroy-hernández et al. |
| 11,128,586 | B2 | 9/2021 | Al Majid et al. |
| 11,188,190 | B2 | 11/2021 | Blackstock et al. |
| 11,189,070 | B2 | 11/2021 | Jahangiri et al. |
| 11,196,963 | B1 | 12/2021 | Dipasquale et al. |
| 11,199,957 | B1 | 12/2021 | Alvi et al. |
| 11,218,433 | B2 | 1/2022 | Baldwin et al. |
| 11,229,849 | B2 | 1/2022 | Blackstock et al. |
| 11,245,658 | B2 | 2/2022 | Grantham et al. |
| 11,249,614 | B2 | 2/2022 | Brody |
| 11,263,254 | B2 | 3/2022 | Baril et al. |
| 11,270,491 | B2 | 3/2022 | Monroy-Hernández et al. |
| 11,284,144 | B2 | 3/2022 | Kotsopoulos et al. |
| 11,307,747 | B2 | 4/2022 | Dancie et al. |
| 12,034,680 | B2 | 7/2024 | Desserrey et al. |
| 12,170,638 | B2 | 12/2024 | Desserrey et al. |
| 12,218,893 | B2 | 2/2025 | Desserrey et al. |
| 2002/0067362 | A1 | 6/2002 | Agostino Nocera et al. |
| 2002/0169644 | A1 | 11/2002 | Greene |
| 2005/0162419 | A1 | 7/2005 | Kim et al. |
| 2005/0206610 | A1 | 9/2005 | Cordelli |
| 2006/0002315 | A1 | 1/2006 | Theurer et al. |

(56) References Cited

U.S. PATENT DOCUMENTS

| | | | |
|---|---|---|---|
| 2006/0294465 | A1 | 12/2006 | Ronen et al. |
| 2007/0047697 | A1* | 3/2007 | Drewry ............. H04M 3/42263 379/88.13 |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |
| 2008/0158222 | A1 | 7/2008 | Li et al. |
| 2009/0016617 | A1 | 1/2009 | Bregman-amitai et al. |
| 2009/0055484 | A1 | 2/2009 | Vuong et al. |
| 2009/0070688 | A1 | 3/2009 | Gyorfi et al. |
| 2009/0099925 | A1 | 4/2009 | Mehta et al. |
| 2009/0106672 | A1 | 4/2009 | Burstrom |
| 2009/0158170 | A1 | 6/2009 | Narayanan et al. |
| 2009/0177976 | A1 | 7/2009 | Bokor et al. |
| 2009/0202114 | A1 | 8/2009 | Morin et al. |
| 2009/0265604 | A1 | 10/2009 | Howard et al. |
| 2009/0300525 | A1 | 12/2009 | Jolliff et al. |
| 2009/0303984 | A1 | 12/2009 | Clark et al. |
| 2010/0011422 | A1 | 1/2010 | Mason et al. |
| 2010/0023885 | A1 | 1/2010 | Reville et al. |
| 2010/0115426 | A1 | 5/2010 | Liu et al. |
| 2010/0162149 | A1 | 6/2010 | Sheleheda et al. |
| 2010/0203968 | A1 | 8/2010 | Gill et al. |
| 2010/0227682 | A1 | 9/2010 | Reville et al. |
| 2011/0093780 | A1 | 4/2011 | Dunn |
| 2011/0115798 | A1 | 5/2011 | Nayar et al. |
| 2011/0148864 | A1 | 6/2011 | Lee et al. |
| 2011/0239136 | A1 | 9/2011 | Goldman et al. |
| 2011/0282959 | A1 | 11/2011 | Anderson |
| 2012/0113106 | A1 | 5/2012 | Choi et al. |
| 2012/0124458 | A1 | 5/2012 | Cruzada |
| 2012/0130717 | A1 | 5/2012 | Xu et al. |
| 2013/0103760 | A1 | 4/2013 | Golding et al. |
| 2013/0201187 | A1 | 8/2013 | Tong et al. |
| 2013/0249948 | A1 | 9/2013 | Reitan |
| 2013/0257877 | A1 | 10/2013 | Davis |
| 2014/0043329 | A1 | 2/2014 | Wang et al. |
| 2014/0055554 | A1 | 2/2014 | Du et al. |
| 2014/0125678 | A1 | 5/2014 | Wang et al. |
| 2014/0129343 | A1 | 5/2014 | Finster et al. |
| 2014/0267550 | A1 | 9/2014 | Nimri et al. |
| 2015/0195097 | A1* | 7/2015 | Grigsby ................ G06F 3/0484 715/753 |
| 2015/0206349 | A1 | 7/2015 | Rosenthal et al. |
| 2016/0134840 | A1 | 5/2016 | Mcculloch |
| 2016/0234149 | A1 | 8/2016 | Tsuda et al. |
| 2017/0080346 | A1 | 3/2017 | Abbas |
| 2017/0087473 | A1 | 3/2017 | Siegel et al. |
| 2017/0113140 | A1 | 4/2017 | Blackstock et al. |
| 2017/0118145 | A1 | 4/2017 | Aittoniemi et al. |
| 2017/0199855 | A1 | 7/2017 | Fishbeck |
| 2017/0235848 | A1 | 8/2017 | Van Deusen et al. |
| 2017/0310934 | A1 | 10/2017 | Du et al. |
| 2017/0312634 | A1 | 11/2017 | Ledoux et al. |
| 2018/0047200 | A1 | 2/2018 | O'hara et al. |
| 2018/0113587 | A1 | 4/2018 | Allen et al. |
| 2018/0115503 | A1 | 4/2018 | Baldwin et al. |
| 2018/0147494 | A1 | 5/2018 | Curtis et al. |
| 2018/0198743 | A1 | 7/2018 | Blackstock et al. |
| 2018/0241705 | A1 | 8/2018 | Sarafa et al. |
| 2018/0315076 | A1 | 11/2018 | Andreou |
| 2018/0315133 | A1 | 11/2018 | Brody et al. |
| 2018/0315134 | A1 | 11/2018 | Amitay et al. |
| 2018/0351903 | A1* | 12/2018 | Allen ..................... G06Q 10/10 |
| 2018/0367483 | A1* | 12/2018 | Rodriguez .............. H04L 65/60 |
| 2019/0001223 | A1 | 1/2019 | Blackstock et al. |
| 2019/0036989 | A1 | 1/2019 | Eirinberg et al. |
| 2019/0057616 | A1 | 2/2019 | Cohen et al. |
| 2019/0097958 | A1 | 3/2019 | Collet et al. |
| 2019/0132405 | A1* | 5/2019 | Song ..................... H04L 51/043 |
| 2019/0155459 | A1 | 5/2019 | Chen et al. |
| 2019/0171338 | A1 | 6/2019 | Voss et al. |
| 2019/0188920 | A1 | 6/2019 | Mcphee et al. |
| 2019/0280997 | A1 | 9/2019 | Baldwin et al. |
| 2020/0028815 | A1* | 1/2020 | He .......................... H04L 51/52 |
| 2020/0306637 | A1 | 10/2020 | Baldwin et al. |
| 2020/0336454 | A1 | 10/2020 | Grantham et al. |
| 2020/0366630 | A1 | 11/2020 | Gorny et al. |
| 2020/0372127 | A1 | 11/2020 | Denton et al. |
| 2020/0410575 | A1 | 12/2020 | Grantham et al. |
| 2021/0074047 | A1 | 3/2021 | Sheth et al. |
| 2021/0089179 | A1 | 3/2021 | Grantham et al. |
| 2021/0104087 | A1 | 4/2021 | Smith et al. |
| 2021/0168108 | A1 | 6/2021 | Antmen et al. |
| 2021/0170270 | A1 | 6/2021 | Brody et al. |
| 2021/0192823 | A1 | 6/2021 | Amitay et al. |
| 2021/0209825 | A1 | 7/2021 | Assouline et al. |
| 2021/0225058 | A1 | 7/2021 | Chand et al. |
| 2021/0240315 | A1 | 8/2021 | Alvi et al. |
| 2021/0243482 | A1 | 8/2021 | Baril et al. |
| 2021/0266277 | A1 | 8/2021 | Allen et al. |
| 2021/0281897 | A1 | 9/2021 | Brody et al. |
| 2021/0285774 | A1 | 9/2021 | Collins et al. |
| 2021/0303140 | A1 | 9/2021 | Mourkogiannis |
| 2021/0306290 | A1 | 9/2021 | Voss |
| 2021/0306451 | A1 | 9/2021 | Heikkinen et al. |
| 2021/0385180 | A1 | 12/2021 | Al Majid et al. |
| 2021/0405831 | A1 | 12/2021 | Mourkogiannis et al. |
| 2021/0409535 | A1 | 12/2021 | Mourkogiannis et al. |
| 2022/0012929 | A1 | 1/2022 | Blackstock et al. |
| 2022/0094652 | A1 | 3/2022 | Lankage |
| 2022/0094653 | A1 | 3/2022 | Boyd et al. |
| 2022/0100331 | A1 | 3/2022 | Desserrey et al. |
| 2022/0115020 | A1 | 4/2022 | Bradley et al. |
| 2022/0321509 | A1 | 10/2022 | Desserrey et al. |
| 2022/0321510 | A1 | 10/2022 | Desserrey et al. |
| 2025/0126084 | A1 | 4/2025 | Desserrey et al. |

FOREIGN PATENT DOCUMENTS

| | | |
|---|---|---|
| CN | 117121461 | 11/2023 |
| CN | 117136533 | 11/2023 |
| EP | 2184092 | 5/2010 |
| JP | 2001230801 | 8/2001 |
| JP | 5497931 | 3/2014 |
| KR | 101445263 | 9/2014 |
| KR | 20200071782 | 6/2020 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | 2022212148 | 10/2022 |
| WO | 2022213033 | 10/2022 |

OTHER PUBLICATIONS

"U.S. Appl. No. 17/396,983, Examiner Interview Summary mailed Mar. 26, 2024", 2 pgs.
"U.S. Appl. No. 17/396,983, Examiner Interview Summary mailed Jul. 10, 2024", 2 pgs.
"U.S. Appl. No. 17/396,983, Final Office Action mailed Apr. 19, 2024", 24 pgs.
"U.S. Appl. No. 17/396,983, Final Office Action mailed Aug. 16, 2023", 20 pgs.
"U.S. Appl. No. 17/396,983, Final Office Action mailed Oct. 26, 2022", 18 pgs.
"U.S. Appl. No. 17/396,983, Non Final Office Action mailed Mar. 8, 2023", 19 pgs.
"U.S. Appl. No. 17/396,983, Non Final Office Action mailed Jul. 6, 2022", 15 pgs.
"U.S. Appl. No. 17/396,983, Non Final Office Action mailed Dec. 27, 2023", 21 pgs.

(56) References Cited

OTHER PUBLICATIONS

"U.S. Appl. No. 17/396,983, Notice of Allowance mailed Aug. 14, 2024", 10 pgs.
"U.S. Appl. No. 17/396,983, Response filed Feb. 23, 2023 to Final Office Action mailed Oct. 26, 2022", 12 pgs.
"U.S. Appl. No. 17/396,983, Response filed Mar. 27, 2024 to Non Final Office Action mailed Dec. 27, 2023", 11 pgs.
"U.S. Appl. No. 17/396,983, Response filed Jul. 10, 2023 to Non Final Office Action mailed Mar. 8, 2023", 10 pgs.
"U.S. Appl. No. 17/396,983, Response filed Jul. 19, 2024 to Final Office Action mailed Apr. 19, 2024", 11 pgs.
"U.S. Appl. No. 17/396,983, Response filed Oct. 6, 2022 to Non Final Office Action mailed Jul. 6, 2022", 11 pgs.
"U.S. Appl. No. 17/396,983, Response filed Dec. 18, 2023 to Final Office Action mailed Aug. 16, 2023", 11 pgs.
"U.S. Appl. No. 17/397,366, Corrected Notice of Allowability mailed Jun. 5, 2024", 2 pgs.
"U.S. Appl. No. 17/397,366, Examiner Interview Summary mailed Feb. 7, 2024", 2 pgs.
"U.S. Appl. No. 17/397,366, Final Office Action mailed Oct. 27, 2023", 16 pgs.
"U.S. Appl. No. 17/397,366, Final Office Action mailed Nov. 10, 2022", 14 pgs.
"U.S. Appl. No. 17/397,366, Non Final Office Action mailed May 10, 2022", 14 pgs.
"U.S. Appl. No. 17/397,366, Non Final Office Action mailed Jun. 8, 2023", 13 pgs.
"U.S. Appl. No. 17/397,366, Notice of Allowance mailed Feb. 29, 2024", 7 pgs.
"U.S. Appl. No. 17/397,366, Response filed Feb. 7, 2024 to Final Office Action mailed Oct. 27, 2023", 11 pgs.
"U.S. Appl. No. 17/397,366, Response filed Aug. 10, 2022 to Non Final Office Action mailed May 10, 2022", 10 pgs.
"U.S. Appl. No. 17/397,366, Response filed Oct. 10, 2023 to Non Final Office Action mailed Jun. 8, 2023", 9 pgs.
"U.S. Appl. No. 17/397,366, Response Filed Feb. 10, 2023 to Final Office Action Mailed Nov. 10, 2022", 10 pgs.
"International Application Serial No. PCT/US2022/021565, International Preliminary Report on Patentability mailed Oct. 12, 2023", 7 pgs.
"International Application Serial No. PCT/US2022/021565, International Search Report mailed Jun. 28, 2022", 4 pgs.
"International Application Serial No. PCT/US2022/021565, Written Opinion mailed Jun. 28, 2022", 6 pgs.
"International Application Serial No. PCT/US2022/071315, International Preliminary Report on Patentability mailed Oct. 12, 2023", 7 pgs.
"International Application Serial No. PCT/US2022/071315, International Search Report mailed Jul. 12, 2022", 4 pgs.
"International Application Serial No. PCT/US2022/071315, Written Opinion mailed Jul. 12, 2022", 5 pgs.
"U.S. Appl. No. 18/680,714, Notice of Allowance mailed Sep. 24, 2024", 8 pgs.
"European Application Serial No. 22715926.6, Communication Pursuant to Article 943 EPC mailed Apr. 10, 2025", 4 pgs.
"European Application Serial No. 22718028.8, Communication Pursuant to Article 943 EPC mailed Apr. 11, 2025", 4 pgs.
"European Application Serial No. 22718028.8 , Response to Communication Pursuant to Rules 161 and 162 EPC Filed May 8, 2024", 15 pgs.
"European Application Serial No. 22715926.6, Response to Communication Pursuant to Rules 161 and 162 EPC Filed May 8, 2024", 16 pgs.
"Korean Application Serial No. 10-2023-7036969, Notice of Preliminary Rejection mailed Sep. 25, 2025", W English Translation, 11 pgs.
"Korean Application Serial No. 10-2023-7037139, Notice of Preliminary Rejection mailed Sep. 26, 2025", w English Translation, 14 pgs.
"U.S. Appl. No. 19/002,377, Non Final Office Action mailed May 18, 2026", 19 pgs.
"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.
"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.
"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.
"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.
"European Application Serial No. 22715926.6, Response filed Aug. 8, 2025 to Communication Pursuant to Article 94(3) EPC mailed Apr. 10, 2025", 13 pgs.
"European Application Serial No. 22718028.8, Response filed Aug. 8, 2025 to Communication Pursuant to Article 94(3) EPC mailed Apr. 11, 2025", 17 pgs.
"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.
"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.
Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

* cited by examiner

USER PRESENCE STATUS INDICATORS GENERATION AND MANAGEMENT IN MULTILEVEL CONVERSATIONS

CLAIM OF PRIORITY

This application is a continuation of U.S. patent application Ser. No. 17/396,983, filed Aug. 9, 2021, which claims the benefit of priority to U.S. Provisional Application Ser. No. 63/168,506, filed Mar. 31, 2021, each of which is incorporated herein by reference in its entirety.

BACKGROUND

Electronic messaging, particularly instant messaging, continues to grow globally in popularity. Users are quickly able to instantly share electronic media content items, including text, electronic images, audio, and video.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
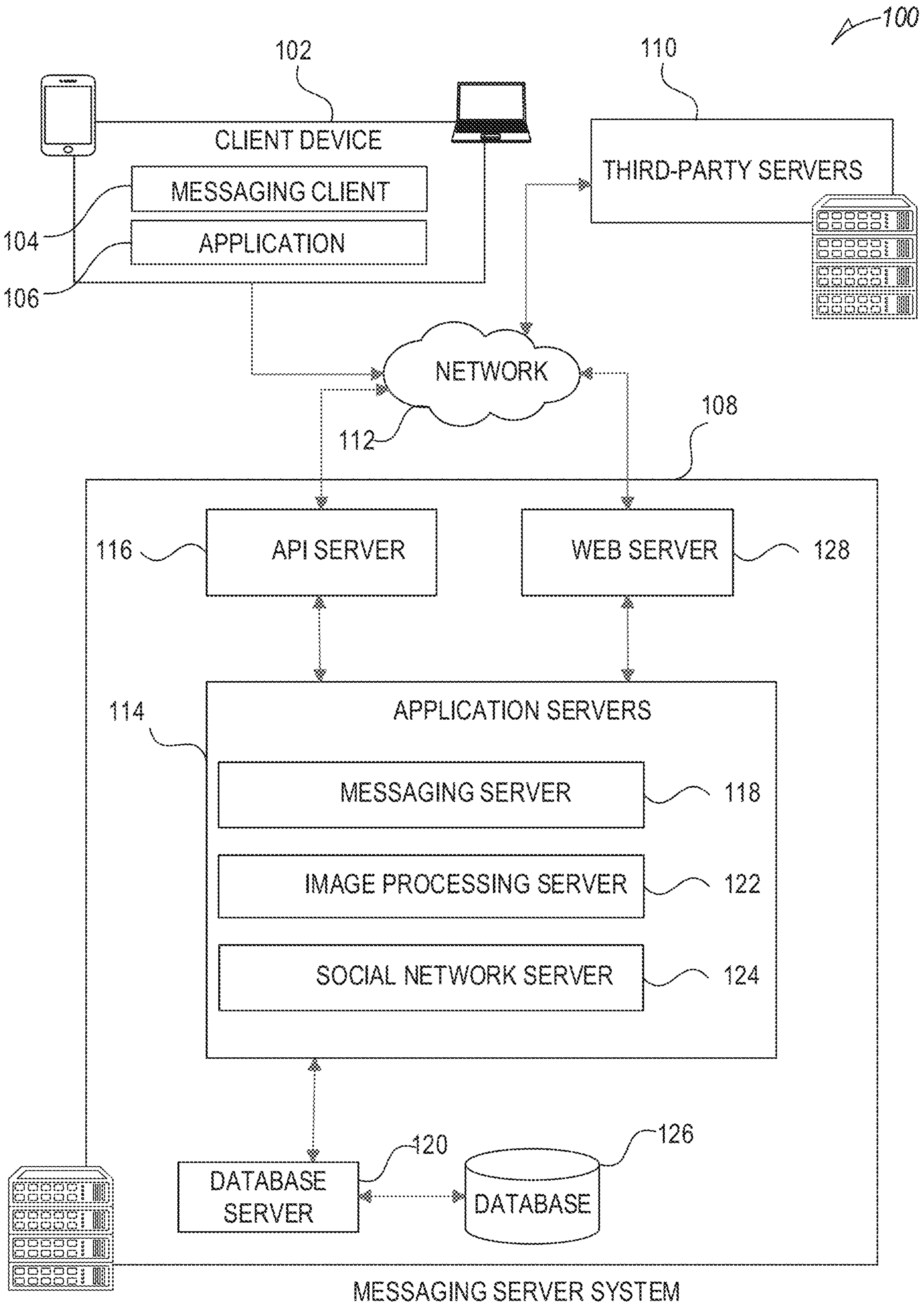
FIG. 1 is a diagrammatic representation of a networked environment in which the present disclosure may be deployed, in accordance with some examples.

In messaging systems, users are connected to various other users with different levels and types of relationships. With the increasing number of users on social networking systems, each user also has a growing network of individuals she follows. Therefore, to maintain user engagement on social networking systems, it is important that the systems have the ability to integrate user presence indications to provide a more interactive and synchronized engagement environment when the users exchange media content items with one another.

A messaging system may implement or otherwise work in conjunction with a social networking system. As such, the existing social networking systems are presented with the challenges of creating a perception of an absence of a user in the system while the user engages in activities with other users in a shared full-screen experience page accessible from a group or a private conversation. For example, a group or a private conversation provided by a messaging application may include a main conversation view from which other experiences (e.g., media content, web links, games, and the like) can be launched in a full-screen mode. When a conversation (e.g., message thread) includes multiple users, it may be difficult to detect which users are present in (e.g., viewing) the conversation, and if so, which user interface they are present in.

Embodiments of the present disclosure improve the functionality of electronic messaging software and systems by providing users a highly interactive and engaging communication environment and a seamless communication experience. Specifically, the messaging system may allow users to continue the communication in various types of full-screen experience pages accessible from the main conversation view of a group chat or a private chat. Depending on the user interface with which a user currently interacts, the messaging system may also generate and display other group users' presence indicators on the user interface. The presence indicators, such as icons (e.g., graphical elements) described further in detail below, reflect other group users' presence status and the types of experience pages currently accessed by the group users. An experience page may be a full-screen display of an activated media content item, such as an image, a video, audio, or a link. An experience page may also be a full-screen display of an activated mini-program, a game, a video or audio call with other users, or content available to the users in the messaging system.

In some embodiments, the messaging system provides for a group conversation between a plurality of users, including a first user and a second user. The group conversation includes the main conversation view and a plurality of experience pages accessible from the main conversation view. In some embodiments, the messaging system determines that the second user is active within one of the main conversation view or the experience page. Upon determining that the second user is active within the main conversation view, the messaging system provides a first graphical element for display on a first device associated with the first user. The first graphical element includes an avatar and the name of the second user. Upon determining that the second user is active within an experience page, the messaging system provides a second graphical element for display on the first device. The second graphical element includes the avatar and name of the second user and an icon representing the type of the experience page. For example, if the experience page is an image, the icon may be a silhouette symbol, such as a smaller version (e.g., element 904), of the image.

In some embodiments, upon determining the second user is no longer active within one of the main conversation view or the experience page, the messaging system provides a third graphical element that only includes the second user's name. In some embodiments, the first and second graphical elements may be associated with vivid colors, enhancing the representation of the user's "present" or "online" status, while the third graphical element may be associated with muted colors, such as a semi-transparent grey color, representing an "absence" or "offline" status of the user.

In some embodiments, each experience page includes an expandable text input bar and a fourth graphical element that is expandable to display a list of chronologically ordered messages (e.g., message thread) sent by the plural users from the main conversation view and each of the experience pages. Therefore, regardless of whether a user is present in the main conversation view or any one of the experience pages, the user can view all incoming messages and reply to those messages from the current page.

In some embodiments, when the messaging system receives a message from a first user, the system determines if the first user and user of the device (e.g., the second user) are active within the same page. If they are not active within the same page, the messaging system may display the message in conjunction with a selectable page source graphical element (e.g., page source indicator) on the user interface of the second user. The page source graphical element includes an indication of the page currently viewed by the first user. For example, if the first user sent the message from a full-screen display of a weblink "xyz.com," the third graphical element may include a selectable text display showing "from xyz.com" as the page source indicator, in conjunction with the display of the message and the name of the first user.

In some embodiments, if the messaging system determines that both the first and the second users are active within the same page (e.g., "xyz.com"), the messaging system may withhold the display of page source indicator "from xyz.com" and only display the name of the first user and the content of the message.

The improved messaging system allows users to maintain communication flow by incorporating the text input bar in each of the experience pages and displaying the full message thread in the group conversation. It allows users to spend time on experience pages while engaging in conversation with others without worrying about rushing back to the main conversation view only to check and respond to unread messages. In addition, the presence indicators allow users to view others' presence status and the types of full-screen experience page that other users are currently accessing. This way, users may stay informed of others' presence status in the conversation, and the types of content they are currently accessing. Further, the improved messaging system allows users to view the page source of a particular message being sent, so that the users may choose to access the experience page to engage in further communication with the sender of the message. The improved messaging system increases the number of exchanged media content items between users and the time the users choose to spend with the messaging system.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108, and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104, where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke the functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
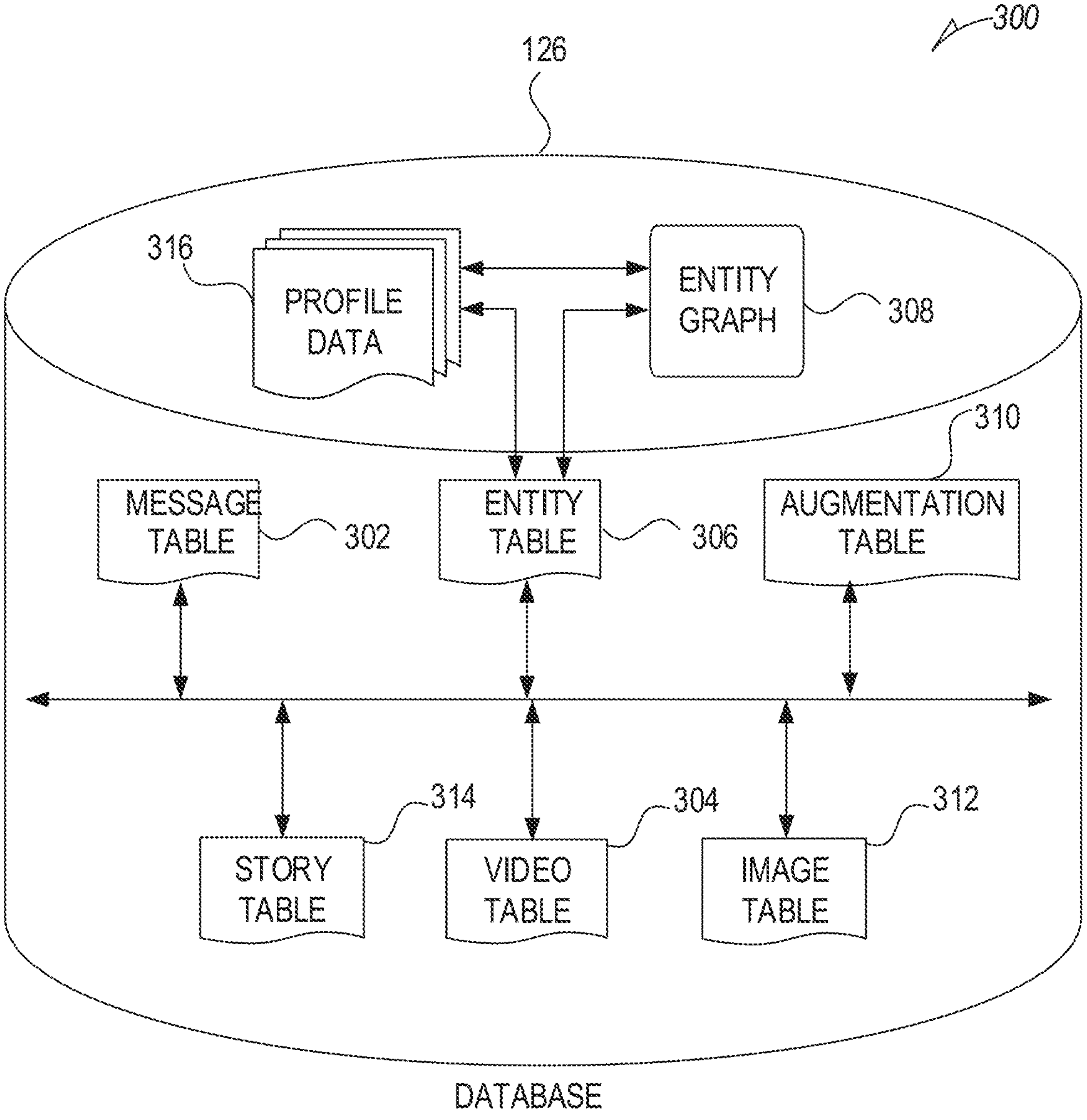
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., application 106, a mini-program, or an applet) are made available to a user via an interface of the messaging client 104. In this context, "external" refers to the fact that application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In some embodiments, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a.*js file or a .json file) and a style sheet (e.g., a.*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104, and, in some embodiments, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users in a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses based on the current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
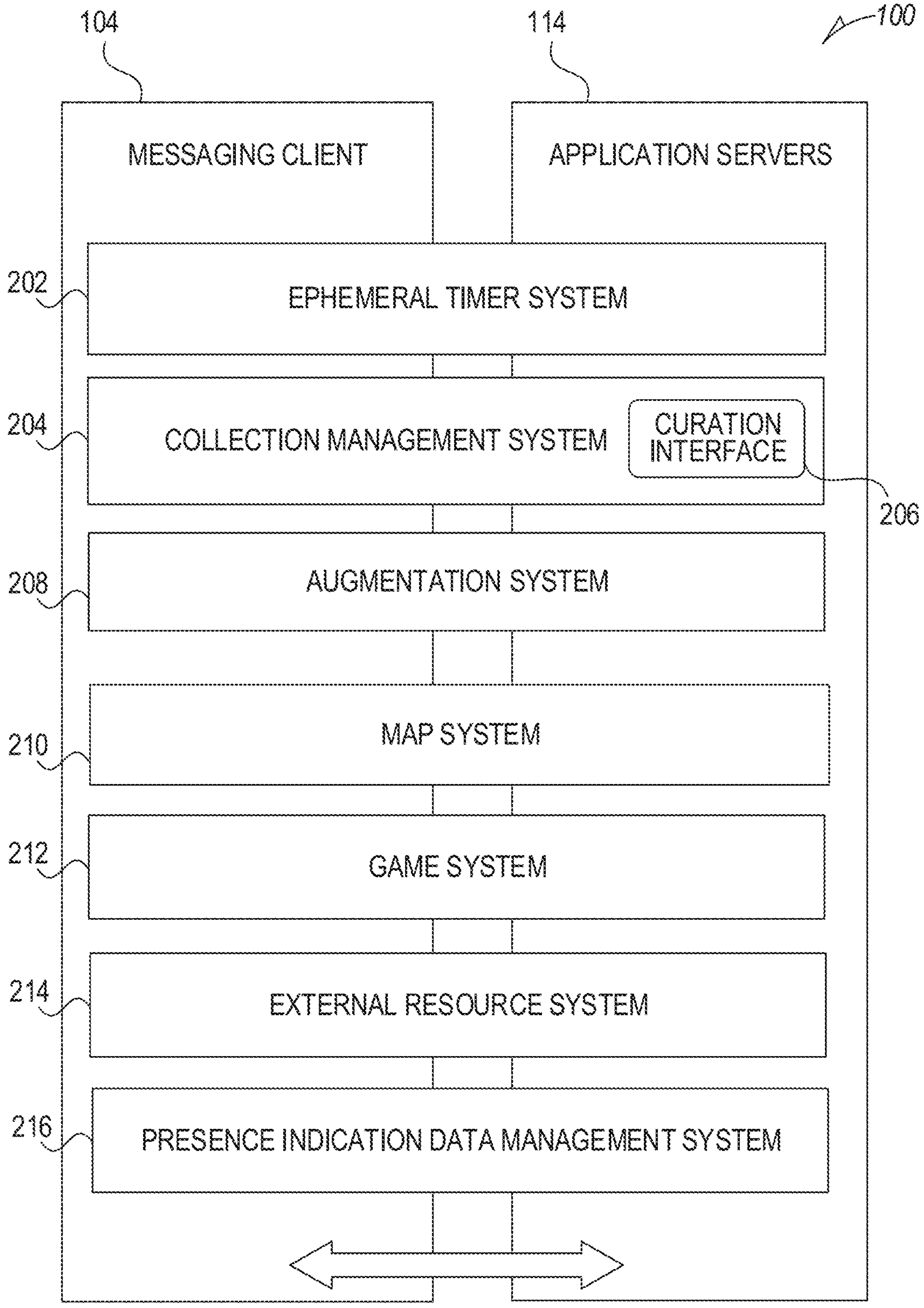
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, an external resource system 214, and a presence indication data management system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or an image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some embodiments, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. The external resources may be mini-programs. Each third-party server 110 hosts, for example, a markup language (e.g., HTML5) based application or small-scale version of an application (e.g., tickets, game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface of the messaging client 104 to access features of the web-based external resource, the messaging client 104 obtains the HTML5 file and instantiates the resources necessary to access the features of the web-based external resource.

In some embodiments, the visual representation of the web-based external resource, such as a mini-program, is accessible from the main conversation view or the experience pages. Upon user selection of the visual representation to instruct the messaging client 104 to launch, a web-based external resource type experience page (e.g., user interfaces 1010 or 1020 in FIG. 10) is generated for accessing features of the web-based external resource. The experience page may include a text input bar and a graphical element expandable to show the message thread.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from the bottom or the middle of the screen, or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some embodiments, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to the first type of user data (e.g., only two-dimensional avatars of users with or without different avatar characteristics). As another example, external resources that include small-scale versions of applications (e.g., web-based versions of applications) are provided with access to the second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The presence indication data management system 216 provides a highly interactive and engaging communication environment that allows users to stay informed of others' presence in a group conversation. In some embodiments, the presence indication data management system 216 allows users to continue the communication in various types of full-screen experience pages accessible from the main conversation view of a group conversation. The presence indication data management system 216 may generate and display other group users' user presence indicators on the main conversation view or the experience pages. The presence indicators represent other group users' presence status and the types of experience pages currently accessed by the group users.

In some embodiments, the presence indication data management system 216 generates and displays a page source graphical element indicating the page source from which a message is transmitted. The page source graphical element may be activated to redirect the user to the source page.

Figure 10:
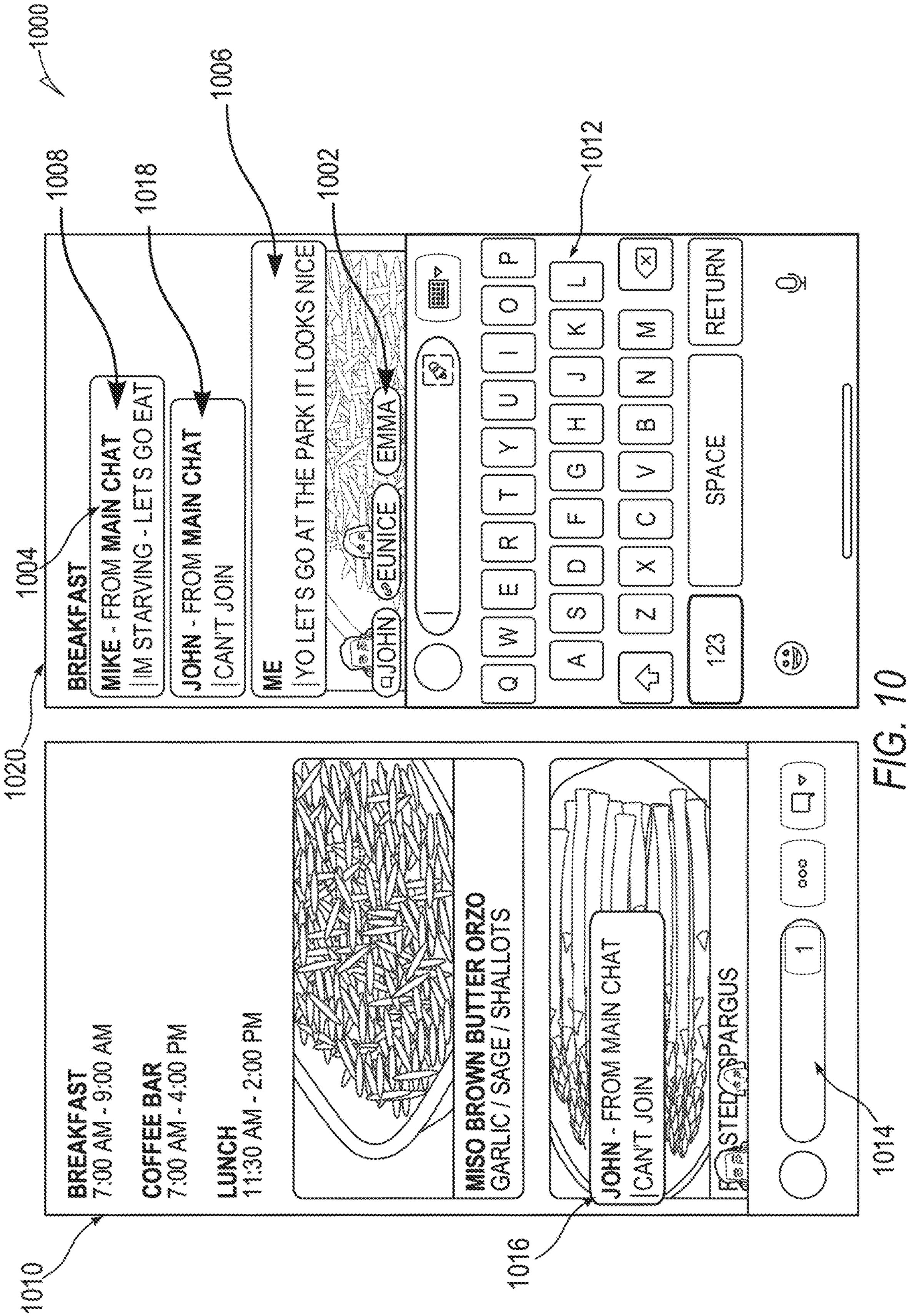
FIG. 10 illustrates user interfaces related to presence indicators and page source indicators displayed on a client device, in accordance with one embodiment.

In some embodiments, the presence indication data management system 216 generates and displays an expandable text input bar and a list of chronologically ordered messages (e.g., message thread comprised by messages 1008, 1018, and 1006 as shown in FIG. 10) received from the group users active from the main conversation view and experience pages.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in some embodiments, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, and augmented reality images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some embodiments, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some embodiments, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

In some embodiments, the graphical user interface may be the main conversation view of a group conversation or an experience page accessible from the main conversation view.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

As mentioned above, the video table 304 stores video data that, in some embodiments, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
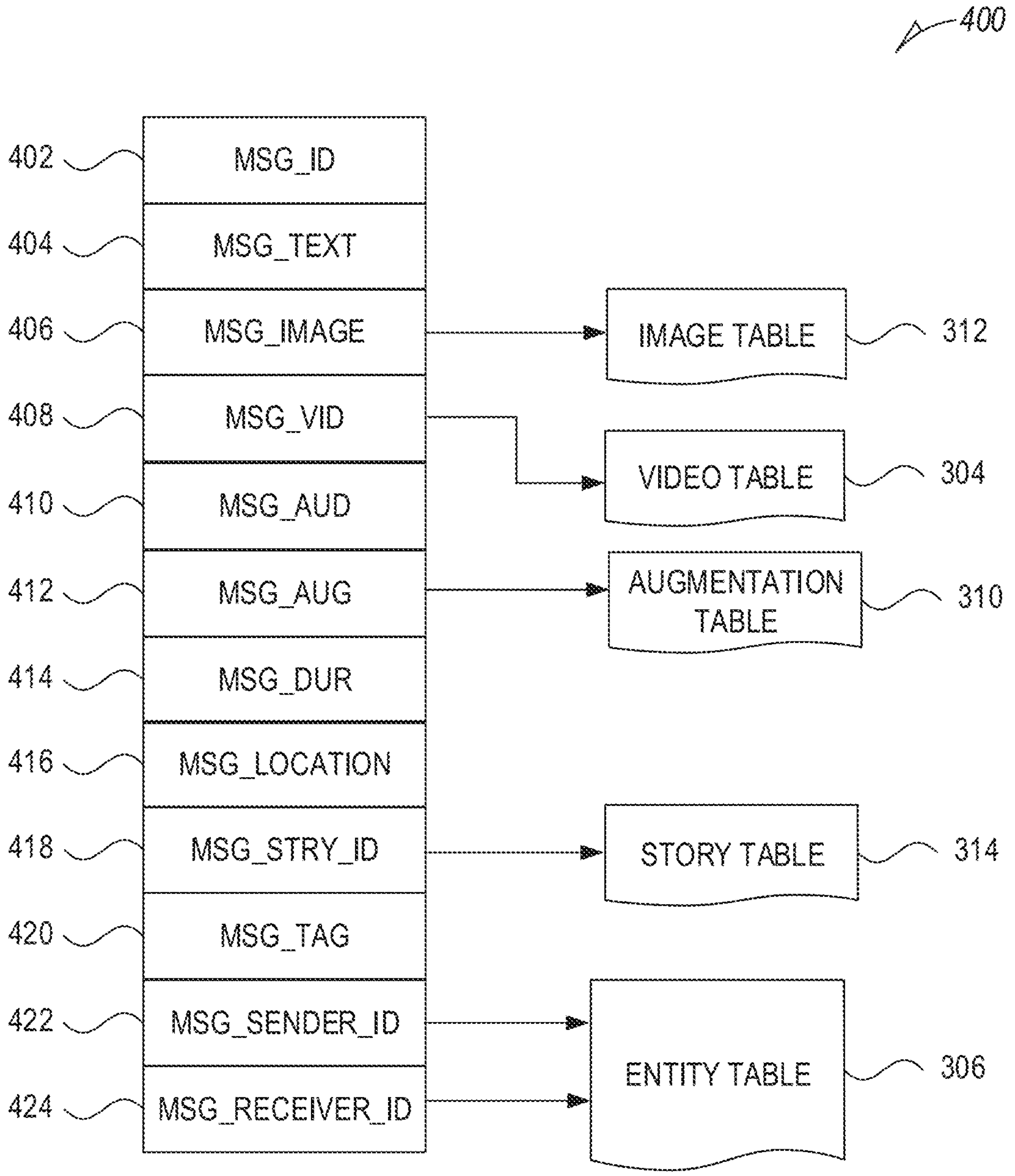
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
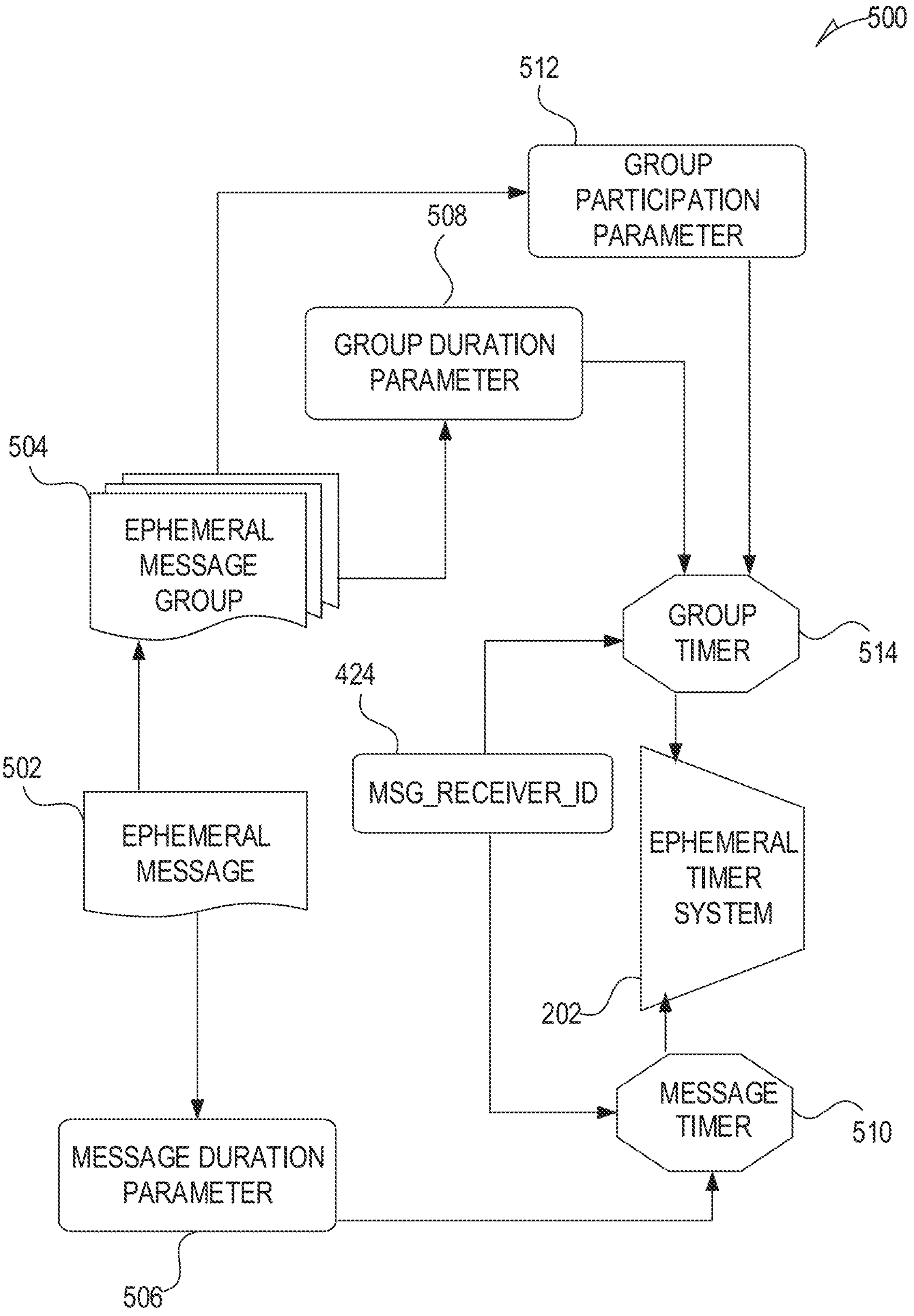
FIG. 5 is a flowchart for an access-limiting process, in accordance with some examples.

FIG. 5 is a schematic diagram illustrating an access-limiting process 500, in terms of which access to content (e.g., an ephemeral message 502 and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In some embodiments, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In some embodiments, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

User Presence Indication Data Management

In some embodiments, the presence indication data management system 216 allows users to continue the communication in various types of full-screen experience pages accessible from the main conversation view of a group conversation. The presence indication data management system 216 may generate and display other group users' user presence indicators on the main conversation view or the experience pages. The presence indicators represent other group users' presence status and the types of experience pages currently accessed by the group users.

In some embodiments, the presence indication data management system 216 generates and displays a page source graphical element indicating the page source from which a message is transmitted. The page source graphical element may be activated to redirect the user to the source page.

In some embodiments, the presence indication data management system 216 generates and displays an expandable text input bar and a graphical element that is expandable to display a list of chronologically ordered messages (e.g., message thread) sent by the plural users from the main conversation view and each of the experience pages.

Figure 6:
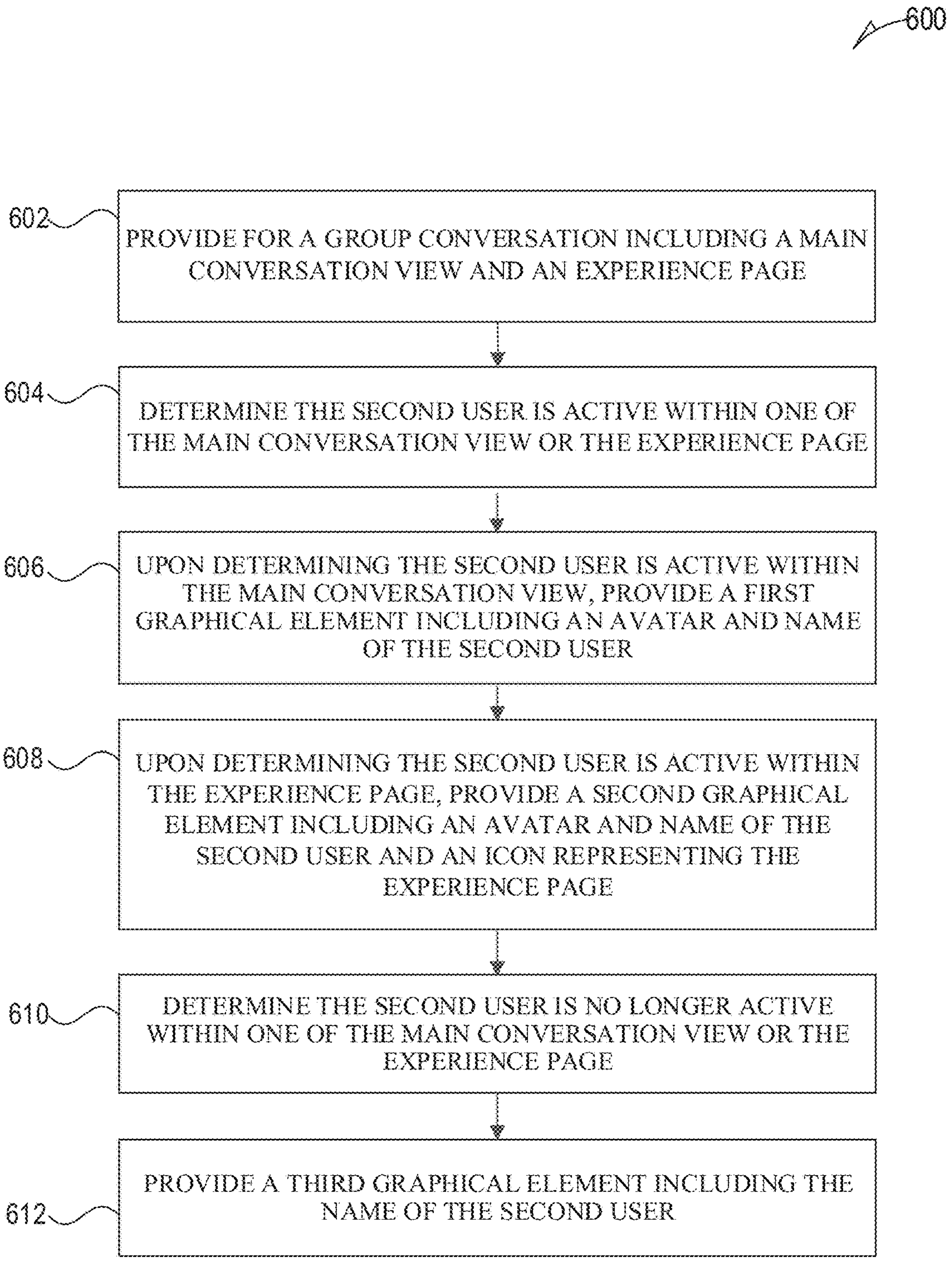
FIG. 6 illustrates a process of providing presence indicators of users in a conversation, in accordance with one embodiment.

FIG. 6 illustrates a process 600 of providing presence indicators of users in a conversation, in accordance with one embodiment. The operations of process 600 may be performed by any number of different systems, such as the messaging client 104 described herein or the messaging server 114, or any portion thereof, such as a processor included in any of the systems, including the presence indication data management system 216.

At operation 602, the processor provides for a group conversation between multiple users, including a first user and a second user. The group conversation may be a group chat between more than two users or a private chat between two users. The group conversation includes a main conversation view and an experience page that is accessible from the main conversation view. In some embodiments, the group conversation may include more than one experience page. An experience page may be a full-screen display on a user interface generated upon activating a media content item, a web-based external resource, or a full-screen call accessible from the group conversation. A media content item may be an image, a video, audio, or a weblink.

At operation 604, the processor determines that the second user is active within one of the main conversation view or the experience page. The determination of the active status of a particular user may include detection of user activities associated with a particular user interface, either the main conversation view or an experience page. For example, if the processor detects a user interaction with the main conversation view within a pre-determined time period, the processor may determine that the user is currently active within the main conversation view.

At operation 606, upon determining that the second user is active in the main conversation view, the processor provides a first graphical element for display on the first device of the first user. The first graphical element (not shown) includes an avatar and the name of the second user.

Figure 9:
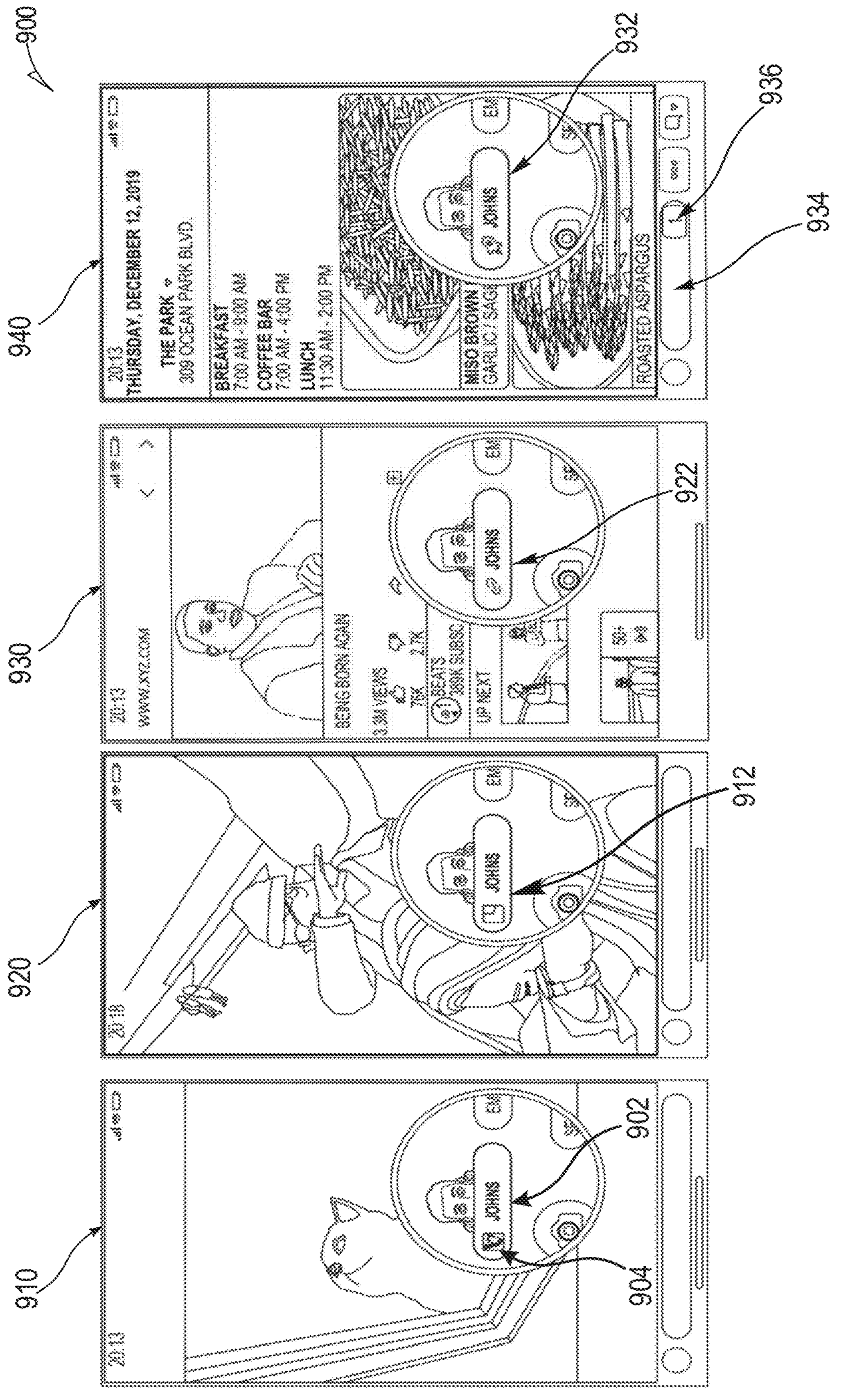
FIG. 9 illustrates user interfaces related to presence indicators displayed on a client device, in accordance with one embodiment.

At operation 608, upon determining that the second user is active in the experience page instead of the main conversation view, the processor provides a second graphical element for display on the first device. The second graphical element includes the avatar and name of the second user and an icon representing the type of the experience page. For example, as shown in FIG. 9, the user interfaces 910, 920, 930, and 940 are examples of different types of experience pages. Specifically, the experience page 910 is generated as a full-screen display of an image, experience page 920 is generated as a full-screen display of a video or audio, experience page 930 is generated as a full-screen display of a weblink, and experience page 940 is generated as a full-screen display of a web-based external resource (e.g., a mini-program).

The graphical elements 902, 912, 922, 932 are examples of the second graphical element (e.g., presence indicators). Each example shows the second graphical element generated for a different type of experience page. Specifically, element 902 represents an image type of experience page, element 912 represents a video or audio type of experience page, element 922 represents a weblink type of experience page, and element 932 represents a mini-program type of experience page. In one example, if the processor determines the second user is currently viewing the image as shown in experience page 910, the processor may generate a silhouette symbol (e.g., element 904) representing the image on the device of other users in the group conversation. As shown in element 902, the processor may display a presence indicator to include the silhouette symbol in conjunction with the name (e.g., John) and the avatar of the second user (e.g., the peeking avatar with hands showing half of the face) on the device of other users in the group conversation. Thereby, others may know the type of content John is currently viewing and whether he is currently present in the group conversation.

At operation 610, the processor may determine that the second user is no longer active within one of the main conversation view or the experience page. The detection may be based on a lack of user activity detected from the device of the second user within a pre-determined time period. The pre-determined time period may be configured to range from few seconds to several minutes, for example. The shorter it is, the more likely a user remains active within the main conversation view or the experience page.

At operation 612, upon determining that the second user is no longer active, the processor may provide a third graphical element for display on the first device of the first user. The third graphical element includes only the name of the second user. An example of the third graphical element may be the element 1002 as shown in FIG. 10. The element 1002 may be displayed in muted colors, in contrast with vivid colors, representing an "absence" or "offline" status of the user (e.g., Emma).

In some embodiments, each experience page may include an expandable text input bar (element 934 as shown in FIG. 9) and a fourth graphical element (e.g., element 936) that is expandable to display a list of messages from the users of the group conversation. For example, a user may tab on the expandable text input bar 934 on a user interface to trigger a display of a keyboard (not shown), and may tab on the graphical element 936 to trigger a display of a full message thread or only the unread messages from the group conversation. The number of unread messages may appear on the fourth graphical element. The number "1" as shown in element 936 represents one unread message. The message thread (not shown) may be displayed in the left portion of the user interface 940, and may be dismissed when the user tabs any empty space (e.g., portions where the messages are not displayed) of the user interface.

Figure 7:
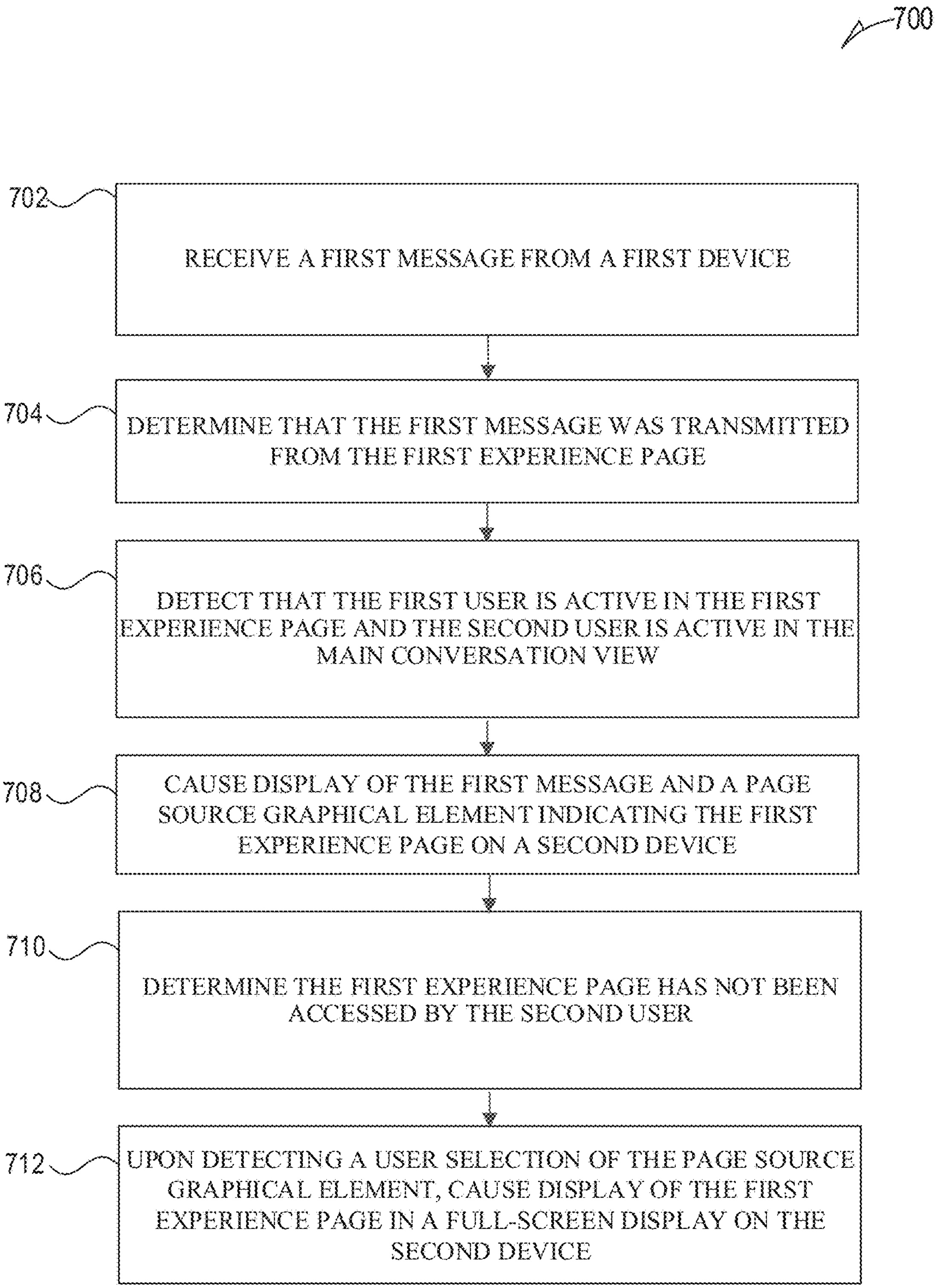
FIG. 7 illustrates a process of providing page source indicators based on user presence status, in accordance with one embodiment.

FIG. 7 illustrates a process 700 of providing page source indicators based on user presence status, in accordance with one embodiment. The operations of process 700 may be performed by any number of different systems, such as the messaging client 104 described herein or the messaging server 114, or any portion thereof, such as a processor included in any of the systems, including the presence indication data management system 216.

At operation 702, the processor receives the first message from a first device associated with a first user. The first message may be sent to a group conversation joined by multiple users, including the first user and a second user. The group conversation includes the main conversation view and an experience page that is accessible from the main conversation view. In some embodiments, the group conversation may include more than one experience page. An experience page may be a full-screen display on a user interface generated upon activating a media content item, a web-based external resource, or a video or audio call accessible from the group conversation. A media content item may be an image, a video, audio, or a weblink.

At operation 704, the processor determines the first message was transmitted from the first experience page. For example, the processor may identify the page source identifier included in the metadata of the first message to determine if the message was sent from the user interface of the first experience page.

At operation 706, the processor detects that the first user is currently active within the first experience page and the second user is active in the main conversation view. The determination of the active status of a particular user may include detection of user activities associated with a particular user interface. For example, if the processor detects a user interaction with the main conversation view within a pre-determined time period, the processor may determine that the user is currently active within the main conversation view.

Figure 11:
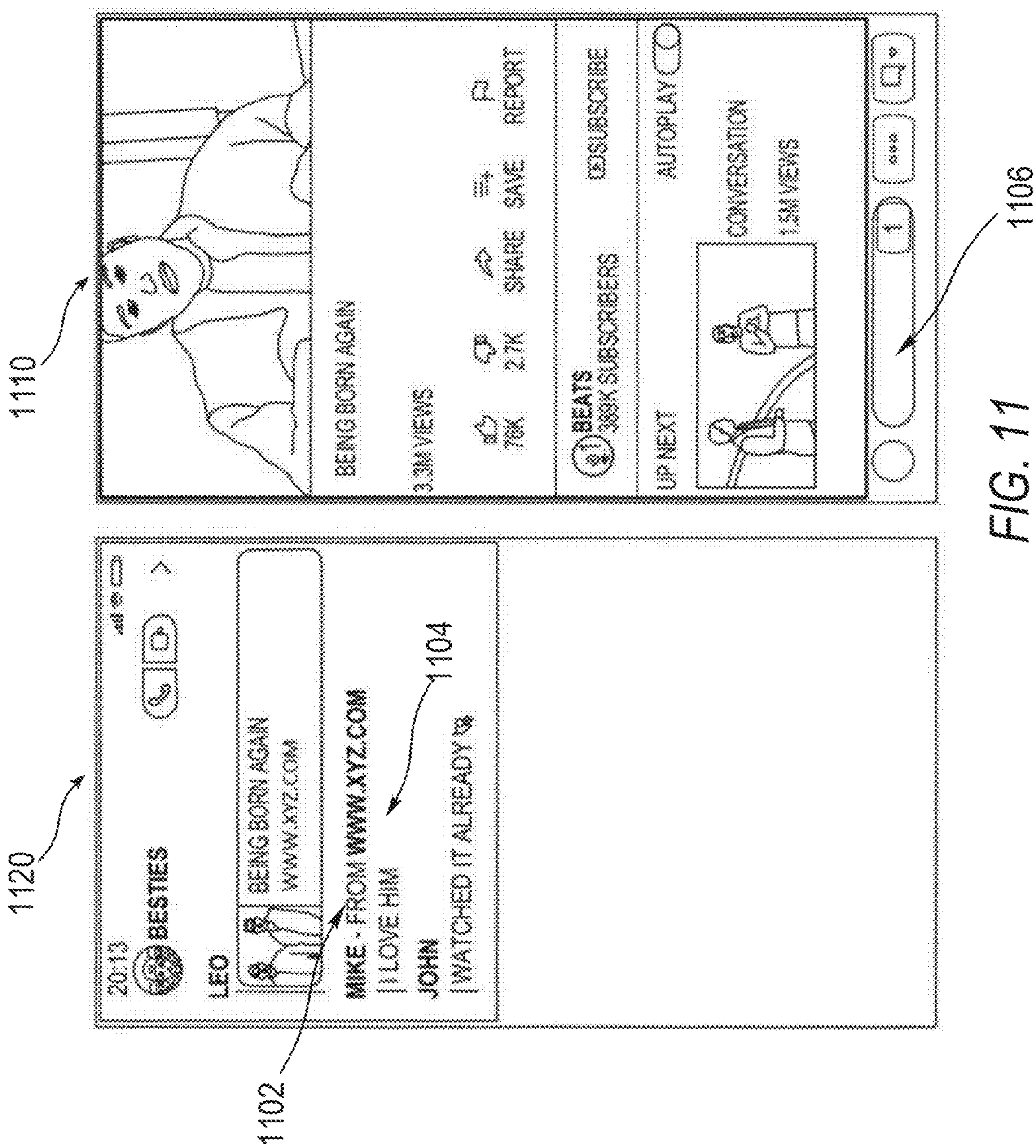
FIG. 11 illustrates user interfaces related to page source indicators displayed on a client device, in accordance with one embodiment.

At operation 708, the processor causes the display of the first message and a page source graphical element on a second device associated with the second user. An example of the page source graphical element may be element 1004 as shown in FIG. 10 or element 1102 as shown in FIG. 11. The page source graphical element includes a name of the first user and a page source indicator of the first experience page, such as "From Main Chat" in element 1004, or "From xyz.com" in element 1102.

At operation 710, the processor determines that the first experience page has not been previously accessed by the second user. The determination may be based on an access identifier in the metadata associated with the first experience page.

At operation 712, upon detecting a user selection of the page source graphical element, the processor causes the display of the first experience page in a full-screen display on the second device. A user may tab on the page source graphical element to trigger the full-screen display of the corresponding experience page. For example, in user interface 1020, as shown in FIG. 10, a user may tab on the page source graphical element 1004 to activate the display of the main conversation view, such as user interface 1120. As another example, in user interface 1120, as shown in FIG. 11, a user may tab on the page source graphical element 1102 to activate the display of the weblink type experience page as shown in user interface 1110.

Figure 8:
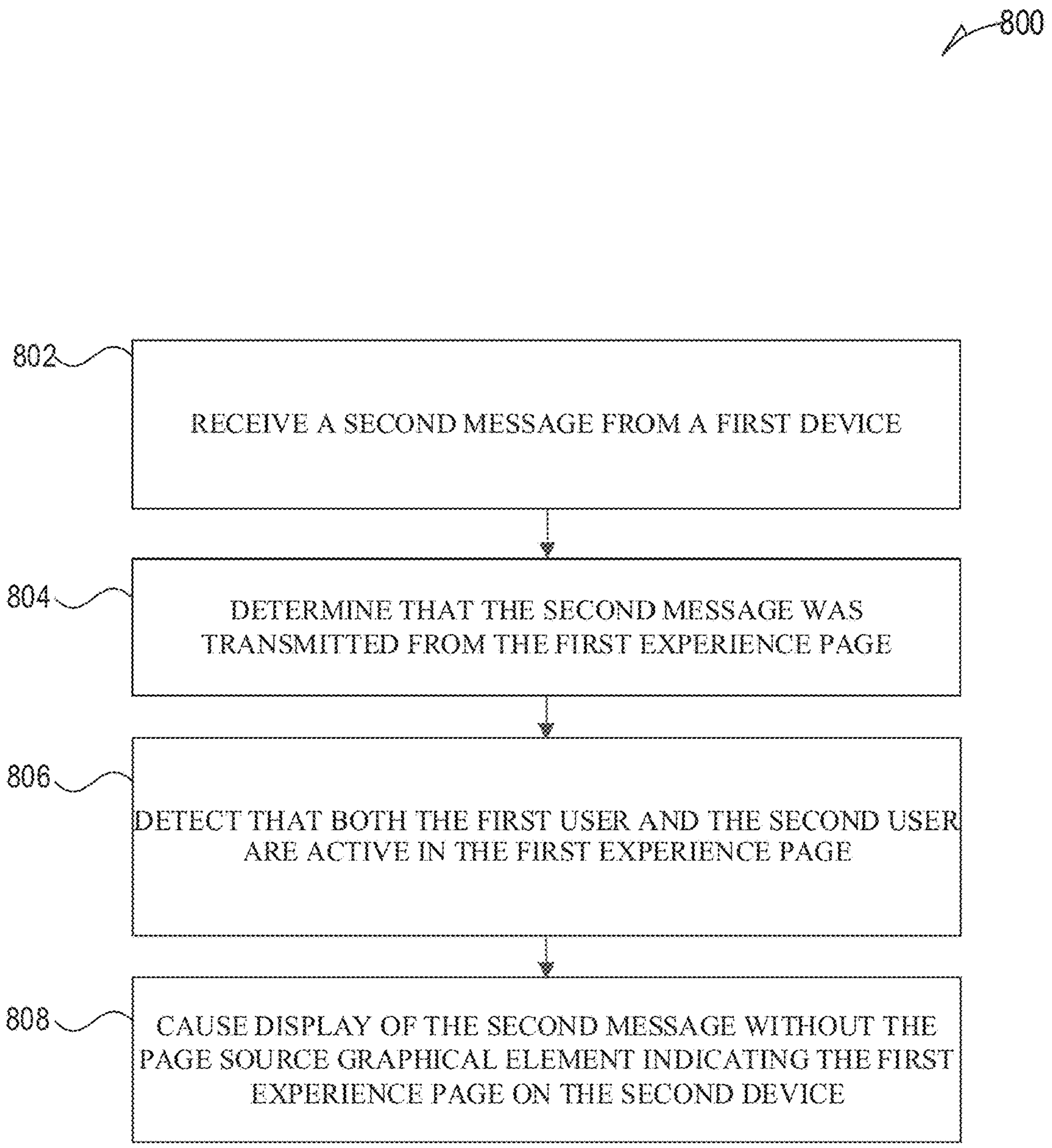
FIG. 8 illustrates a process of withholding page source indicators based on user presence status, in accordance with one embodiment.

FIG. 8 illustrates a process 800 of withholding page source indicators based on user presence status, in accordance with one embodiment. The operations of process 800 may be performed by any number of different systems, such as the messaging client 104 described herein or the messaging server 114, or any portion thereof, such as a processor included in any of the systems, including the presence indication data management system 216.

At operation 802, the processor receives a second message from the first device associated with the first user. The first message may be sent to a group conversation joined by multiple users, including the first user and a second user. The group conversation includes a main conversation view and an experience page that is accessible from the main conversation view.

At operation 804, the processor determines the second message was transmitted from the first experience page. For example, the processor may identify the page source identifier included in the metadata of the first message to determine if the message was sent from the user interface of the first experience page.

At operation 806, the processor detects that both the first user and the second user are active within the first experience page. The determination of the active status of a particular user may include detection of user activities associated with a particular user interface. For example, if the processor detects a user interaction with the main conversation view within a pre-determined time period, the processor may determine that the user is currently active within the main conversation view.

At operation 808, the processor causes the display of the second message to include the content of the second message without a showing of the page source graphical element referring to the first experience page as the page source from which the message was sent. For example, the second message may be displayed as element 1006, as shown in FIG. 10. In some embodiments, the processor withholds the display of page source graphical element if both users are accessing the same experience page, such as the user interface 1020, as shown in FIG. 10.

FIG. 9 illustrates user interfaces related to presence indicators displayed on a client device, in accordance with one embodiment. As shown in FIG. 9, the user interfaces 910, 920, 930, and 940 are examples of different types of experience pages. Specifically, user interface 910 is an image type experience page, user interface 920 is a video or audio type experience page, user interface 930 is a weblink type of experience page, and user interface 940 is a mini-program or game type of experience page. The graphical elements 902, 912, 922, 932 included in each experience page are examples of the second graphical element (e.g., presence indicators) of the particular user named "John." If more users are included in a group conversation, an experience page may include a presence indicator for each user except for the user of the display device. The presence indicators may be displayed at the bottom portion (e.g., above the expandable text bar) of the experience pages.

FIG. 10 illustrates user interfaces related to presence indicators and page source indicators displayed on a client device, in accordance with one embodiment. The user interface 1010 may be a mini-program type of experience page. A message 1016 displayed on the user interface 1010 includes the content of the message "Can't join," the name of the user "John," and the page source indicator "From Main Chat." The page source indicator may be in muted grey color, indicating that the message has been viewed in the main conversation view by the user of the display device.

The user interface 1020 may be the user interface 1010 after the text input bar 1014 is activated and expanded into the keyboard 1012. The presence indicators of users John, Eunice, and Emma are displayed above keyboard 1012. A message 1008 is displayed in the user interface 1020, and includes the content of the message "I'm starving-let's go eat," the name of the user "Mike," and the page source indicator "From Main Chat." The page source indicator in message 1008 may be associated with vivid colors, indicating that the message has not been viewed in the main conversation view by the user of the display device, and may be activated to direct the user to the main conversation view.

FIG. 11 illustrates user interfaces related to page source indicators displayed on a client device, in accordance with one embodiment. The user interface 1120 may be the main conversation view of the group conversation, and the user interface 1110 may be one of the experience pages accessible from the main conversation view. A message 1104 includes the content of the message "I love him," the name of the user Mike, and a selectable page source indicator "From xyz.com." Upon activation by user selection, the page source indicator may be triggered to cause the display of user interface 1110, which is a weblink type experience page. The user interface 1110 includes a text input bar 1106 that is expandable to display a keyboard, such as the keyboard 1012 as shown in FIG. 10.

Machine Architecture

Figure 12:
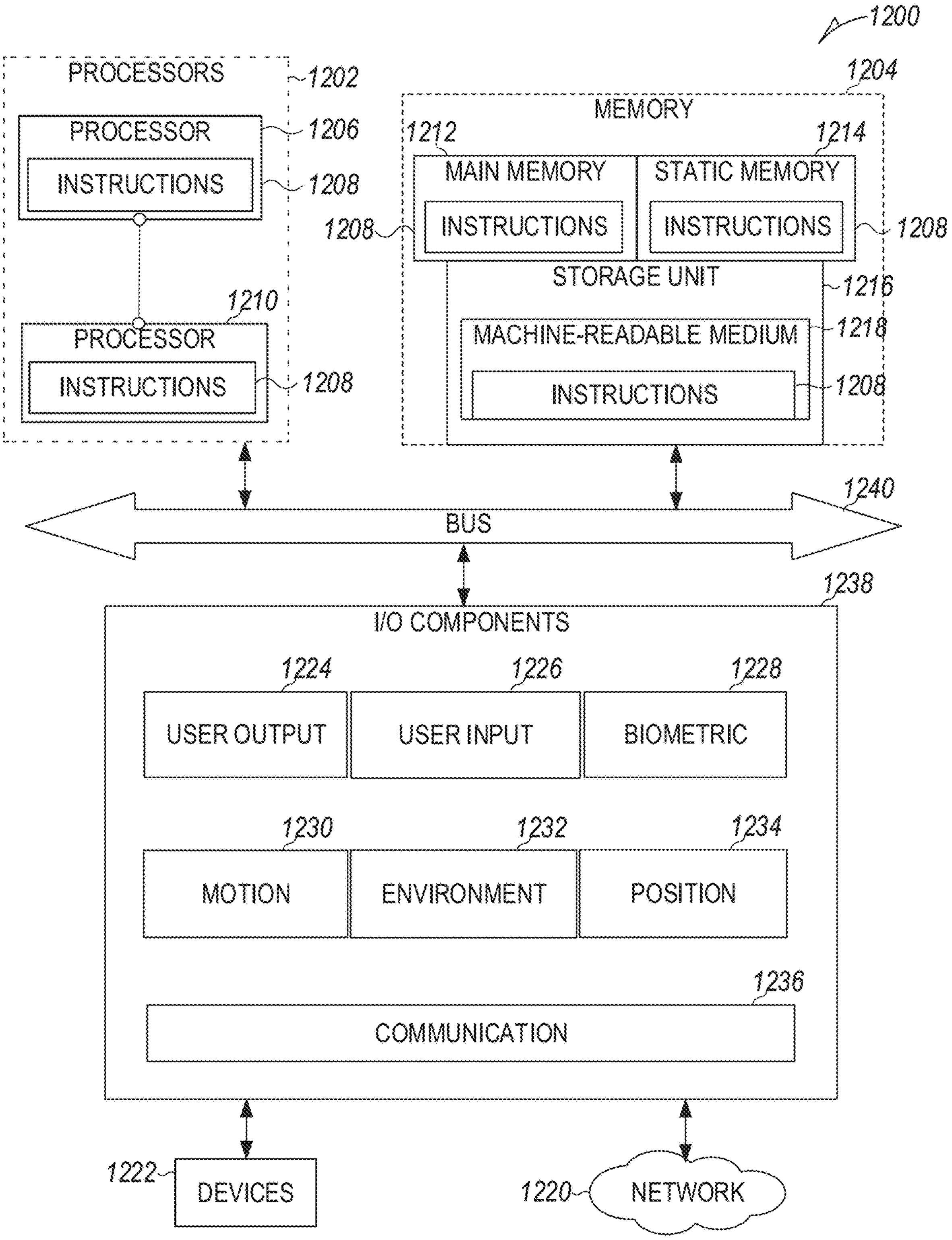
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein. The machine 1200, for example, may comprise the client device 102 or any one of a number of server devices forming part of the messaging server system 108. In some embodiments, the machine 1200 may also comprise both client and server systems, with certain operations of a particular method or algorithm being performed on the server-side and with certain operations of the particular method or algorithm being performed on the client-side.

The machine 1200 may include processors 1202, memory 1204, and input/output (I/O) components 1238, which may be configured to communicate with each other via a bus 1240. In an example, the processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single-core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, all accessible to the processors 1202 via the bus 1240. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218, within the storage unit 1216, within at least one of the processors 1202 (e.g., within the processor's cache memory), or any suitable combination thereof, during execution thereof by the machine 1200.

The I/O components 1238 may include a wide variety of components to receive input, provide output, produce output, transmit information, exchange information, capture measurements, and so on. The specific I/O components 1238 that are included in a particular machine will depend on the type of machine. For example, portable machines such as mobile phones may include a touch input device or other such input mechanisms, while a headless server machine will likely not include such a touch input device. It will be appreciated that the I/O components 1238 may include many other components that are not shown in FIG. 12. In various examples, the I/O components 1238 may include user output components 1224 and user input components 1226. The user output components 1224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1238 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 include acceleration sensor components (e.g., accelerometer), gravitation sensor components, or rotation sensor components (e.g., gyroscope).

The environmental components 1232 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1238 further include communication components 1236 operable to couple the machine 1200 to a network 1220 or devices 1222 via respective coupling or connections. For example, the communication components 1236 may include a network interface component or another suitable device to interface with the network 1220. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1212, static memory 1214, and memory of the processors 1202) and storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed examples.

The instructions 1208 may be transmitted or received over the network 1220, using a transmission medium, via a network interface device (e.g., a network interface component included in the communication components 1236) and using any one of several well-known transfer protocols (e.g., HTTP). Similarly, the instructions 1208 may be transmitted or received using a transmission medium via a coupling (e.g., a peer-to-peer coupling) to the devices 1222.

Software Architecture

Figure 13:
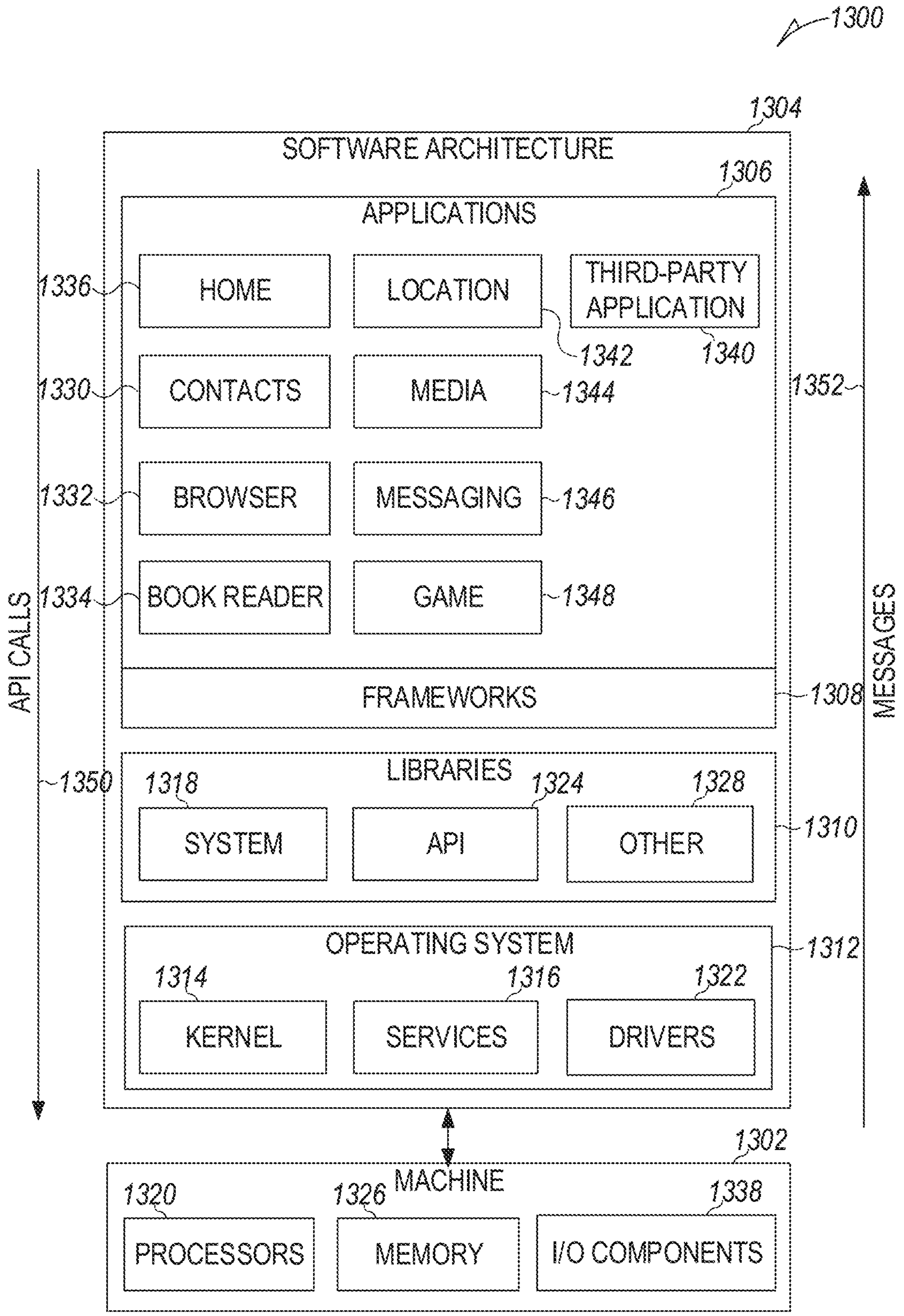
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:

receiving a message via an experience page on a first device, the experience page corresponding to a user interface generated based on a web-based external resource;

determining that the experience page is accessible from a main conversation view associated with a group conversation, the main conversation view corresponding to a user interface that includes a display of a plurality of messages currently exchanged between a plurality of users in the group conversation;

detecting, via the first device, one or more user interactions with the experience page within a predetermined time period;

determining that a user associated with the first device is currently active on the experience page based on the detecting of the one or more user interactions;

generating an active status indicator graphical element for display on a second device, the active status indicator graphical element, upon being displayed, comprising an avatar that represents a physical appearance of the user, a name of the user, and an experience page graphical element representing a type of the experience page, wherein the name of the user and the experience page graphical element are displayed below the avatar in the active status indicator graphical element; and causing display of the active status indicator graphical element on the second device.

2. The method of claim 1, wherein both the experience page and the main conversation view correspond to a full-screen display of a user interface.

3. The method of claim 1, wherein the active status indicator graphical element is displayed in vivid colors representing an online status of the first-user.

4. The method of claim 1, comprising:

determining that the user associated with the first device is no longer active in the group conversation; and generating an offline status indicator graphical element for display on devices associated with other users in the group conversation, the offline status indicator graphical element, upon being displayed, including the name of the user in muted colors representing an offline status of the user.

5. The method of claim 1, wherein the experience page comprises a user interface that displays a media content item that includes one or more of an image, a video, audio, and a link.

6. The method of claim 1, wherein the experience page comprises a user interface generated for a mini-program associated with the web-based external resource, a video call, or an audio call.

7. The method of claim 1, wherein the experience page comprises a text input region and a graphical element expandable to display the plurality of messages currently exchanged between the plurality of users in the group conversation.

8. A system comprising:

one or more processors; and a non-transitory computer readable storage medium comprising instructions that when executed by the one or more processors cause the one or more processors to perform operations comprising:

receiving a message via an experience page on a first device, the experience page corresponding to a user interface generated based on a web-based external resource;

determining that the experience page is accessible from a main conversation view associated with a group conversation, the main conversation view corresponding to a user interface that includes a display of a plurality of messages currently exchanged between a plurality of users in the group conversation;

detecting, via the first device, one or more user interactions with the experience page within a predetermined time period;

determining that a user associated with the first device is currently active on the experience page based on the detecting of the one or more user interactions;

generating an active status indicator graphical element for display on a second device, the active status indicator graphical element, upon being displayed, comprising an avatar that represents a physical appearance of the user, a name of the user, and an experience page graphical element representing a type of the experience page, wherein the name of the user and the experience page graphical element are displayed below the avatar in the active status indicator graphical element; and causing display of the active status indicator graphical element on the second device.

9. The system of claim 8, wherein both the experience page and the main conversation view correspond to a full-screen display of a user interface.

10. The system of claim 8, wherein the active status indicator graphical element is displayed in vivid colors representing an online status of the first user.

11. The system of claim 8, wherein the operations comprise:

determining that the user associated with the first device is no longer active in the group conversation; and generating an offline status indicator graphical element for display on devices associated with other users in the group conversation, the offline status indicator graphical element, upon being displayed, including the name of the user in muted colors representing an offline status of the user.

12. The system of claim 8, wherein the experience page comprises a user interface that displays a media content item that includes one or more of an image, a video, audio, and a link, and wherein the experience page comprises a user interface generated for a mini-program associated with the web-based external resource, a video call, or an audio call.

13. The system of claim 8, wherein the experience page comprises a text input region and a graphical element expandable to display the plurality of messages currently exchanged between the plurality of users in the group conversation.

14. A machine-readable non-transitory storage medium having instruction data executable by a machine to cause the machine to perform operations comprising:

receiving a message via an experience page on a first device, the experience page corresponding to a user interface generated based on a web-based external resource;

determining that the experience page is accessible from a main conversation view associated with a group conversation, the main conversation view corresponding to a user interface that includes a display of a plurality of messages currently exchanged between a plurality of users in the group conversation;

detecting, via the first device, one or more user interactions with the experience page within a predetermined time period;

determining that a user associated with the first device is currently active on the experience page based on the detecting of the one or more user interactions;

generating an active status indicator graphical element for display on a second device, the active status indicator graphical element, upon being displayed, comprising an avatar that represents a physical appearance of the user, a name of the user, and an experience page graphical element representing a type of the experience page, wherein the name of the user and the experience page graphical element are displayed below the avatar in the active status indicator graphical element; and causing display of the active status indicator graphical element on the second device.

* * * * *